DATA PROCESSING SYSTEM EXECUTION RETRY CONTROL

Original Filed Jan. 15, 1968 7 Sheets-Sheet 1

INVENTORS
BRUCE L. McGILVRAY
DONALD J. LANG
WILLIAM E. BOEHNER
MARK W. BEE
BY Edward S. Gershuny
AGENT

| | 90 – 92 | 93 – 96 | 97 – 99 |
|---|---|---|---|
| CPU MODE | RETRY CONTROL SETUP | RETRY CONTROL SETUP | RETRY SOURCE DATA SAVE |
| RETRY MODE | DATA TO AOB | DATA CONTROL | DATA DESTINATION |

United States Patent Office

Re. 27,485
Reissued Sept. 26, 1972

27,485
DATA PROCESSING SYSTEM EXECUTION RETRY CONTROL

Bruce L. McGilvray, Pleasant Valley, Donald J. Lang, Wappingers Falls, William E. Boehner, Poughkeepsie, and Mark W. Bee, Hopewell Junction, N.Y., by International Business Machines Corporation, assignee, Armonk, N.Y.

Original No. 3,533,065, dated Oct. 6, 1970, Ser. No. 697,738, Jan. 15, 1968. Application for reissue Mar. 26, 1971, Ser. No. 128,432
Int. Cl. G06f *11/00*
U.S. Cl. 340—172.5 45 Claims

Matter enclosed in heavy brackets [ ] appears in the original patent but forms no part of this reissue specification; matter printed in italics indicates the additions made by reissue.

ABSTRACT OF THE DISCLOSURE

An electronic data processing machine including hardware controls for providing re-execution of instructions upon detection of a machine malfunction. The illustrative embodiment shows an electronic data processing machine which contains a read only control storage which controls execution of instructions contained in a stored program. Upon detection of an error, hardware controls will restore the machine to a previous correct state and attempt re-execution from said previous correct state.

BACKGROUND OF THE INVENTION

The invention will be described with reference to apparatus embodied in an electronic digital computer containing a read only control storage which controls execution of stored program instructions. However, the invention may be used in data processing machines which do not utilize a read only control storage and in "special-purpose computers" which are built specifically to perform only one (or a very limited number of) tasks, and which have a "program" built into the hardware of the machine.

Electronic digital computers operate upon data in accordance with instructions arranged into a number of programs. Both the data and the instructions are represented by electric signal pulses, each signal being assigned, depending upon its value, either the binary quantity zero (0-bit) or the binary quantity one (1-bit). A plurality of these binary "bits" (binary digits) are arranged to represent a data "word" or an instruction "word." Data words are processed in the system in accordance with the instruction words; instruction words being executed one at a time in sequence as taken from a program.

Instructions are usually executed as a series of time-spaced steps. During the execution of any of these steps, it is possible that there may be a malfunction in the system. Malfunctions, or "errors," can be either short-lived ("transient") or long-lived ("solid"). A transient error may, for example, be the result of a sudden fluctuation in the power supply or the result of a mechanical shock. Failure of a component, such as a vacuum tube or a transistor, may result in a solid error.

In the prior art, the occurrence of an error was usually handled without regard to the classification of the error as transient or solid. In one well-known prior art scheme, the detection of any error would completely stop the system. This resulted in an expensive non-usage of the system until corrective action could be taken by an operator (the "corrective action" often consisted of restarting the job from its very beginning), even though the error might have resulted from a transient condition which had disappeared. The problem of extensive loss of time due to the occasional necessity of restarting a job from its beginning led to another prior art technique known as "program checkpointing" wherein, at spaced intervals of time, all information necessary to restart the job from the time in its performance in which the checkpoint was taken would be read out to an auxiliary storage medium such as a magnetic tape or disk. This information generally included such things as: the total contents of the computer storage; the state of all computer status indicators; the identity of the last record of input data successfully processed (this had to be done for every unit which furnished input to the computer); and the identity of the last record of output data furnished by the computer to each output device. Then, if an error caused the system to stop, all parts of the system could be reset to the condition that they were in at the time the checkpoint was taken and processing could continue from that point. Although the technique of software (program) checkpointing offered advantages when lengthy jobs were executed on a computer, it still had several drawbacks. For example, reinitializing the system to a previous checkpoint still resulted in a significant loss of time, and programmers were sometimes constrained by the requirement that length programs be written in such a manner that checkpoints could be conveniently taken. Perhaps the most severe drawback of the software checkpointing technique was due to the fact that, even when no system errors were detected during the execution of a job (and this was true more often than not), an excessive amount of time and system resources were used in a nonproductive manner in taking the unused checkpoints. Even in those cases where a system error necessitated the utilization of a checkpoint, previous checkpoints which were not used represented non-productive use of time and resources.

Another prior art scheme attempted to isolate transient errors by re-executing instructions during the course of which an error had been detected. If an instruction was recycled a predetermined number of times, the error would be classified as solid and the system would signal the operator that corrective action was necessary. If the error were only transient, the instruction would probably be repeated only once, after which it would have been successfully executed, and no immediate corrective action would have been taken. However, due to the nature of program controlled systems, repetition of every instruction is not always wise. Instructions assume the existence of data within the system. However, the data may have been changed during the first unsuccessful attempt at executing the instruction. Then, if the instruction is repeated, it acts, not upon the assumed data, but upon the data as changed during the previous attempts at execution. Thus, indiscriminate recycling of instructions can result in computational errors, and the seriousness of these errors can become magnified as processing continues. Another prior art approach suspends execution of an instruction at the point at which an error condition occurs, and calls in a special program to analyze the instruction and the point at which the error occurred. The special program determines whether or not it would be safe to attempt to re-execute the instruction. One of the disadvantages of this scheme is that it always requires a program to separate transient errors from solid errors. Also, a machine malfunction occurring during the running of the analysis program will, for all practical purposes, generally be uncorrectable.

Still another prior art technique eliminates some of the above disadvantages by providing, for each instruction, a signal during its execution indicating that the point has been reached after which point the instruction may not be repeated. If an error signal occurs before this point, the instruction is repeated immediately, no damage having occurred to the data in the system and no problem existing as to the generation of erroneous results due to repetition of the instruction. If the error occurs following the point after which the instruction cannot be repeated, the instruction is completed and a programmed analysis of the error is performed. Even with this technique, a system error, which occurred during the programmed analysis would generally be uncorrectable.

It is a primary object of this invention to provide apparatus for recovery from transient errors within a data processing system.

It is a more particular object of the invention to provide apparatus for recovery from all transient errors within the Central Procesisng Unit of a data processing system.

Another object of the invention is to provide apparatus for recovery from errors which, although transisent, may last for a a period of time equal to several cycles of the system.

It is a further object of the invention to accomplish the above without the use of any special software (programs).

Still another object of the invention is to provide apparatus for recovery from transient errors which may occur while said apparatus is in control of the data processing system.

Another object of the invention is to provide apparatus to accomplish the above which is independent of the program being run by the computer.

A still further object of the invention is to provide apparatus for recovery from transient errors which does not affect processing time when no errors are detected.

Still another object of the invention is to provide apparatus for recovery from system errors in the shortest possible time.

The above and other objects are accomplish in accordance with the invention by providing execution retry controls which will assume control of the data processing system when an error is detected. In a prefered embodiment of the invention, the execution retry controls are embodied in a portion of a sequence control unit such as a read only control storage (ROS) which controls execution of programmed instructions that have been supplied to the data processing system. The ROS accomplishes this by controlling the gating of information within the Central Processing Unit (CPU) of the data processing system. When a system error is detected, control of the system will be transferred to the retry controls which will perform the following tasks: restore the machine to an error-free state by handling the residual effects of the hardware errors; make available in its original state any source data that has been changed by the instruction during the execution of which an error has been detected; and restore the CPU to the state that it was in when it began to attempt to execute said instruction. After these tasks are completed, an attempt to re-execute the function during which the error was detected (hereinafter called "retry") will be made under control of the retry controls. If the retry is successful, control of the system will be returned to the CPU.

In accordance with the preferred embodiment of the invention described herein, each ROS word is provided with additional fields to set the conditions necessary for retry. There is also provided a plurality of buffers to hold information (such as source operands, and CPU status indicators) which will be necesary to reset the computer to a previous correct state and which may have been modified during the unsuccessful attempt to execute a function. Preservation of the information necessary for retry is controlled by the additional fields that are added to all of the words in ROS. The actual restoration of this required information is controlled by the retry controls.

In accordance with another aspect of the disclosed preferred embodiment of the invention, the retry controls will control an error counter which counts the number of times that retry of a function is attempted. After a predetermined number of attempts at retry, the error will be classified as "solid" and the system will give an indication to the operator that outside intervention is needed.

The execution retry control system herein disclosed and claimed determines the function that was being executed when an error was detected by querying the Data Processing Machine Function Indicator claimed in copending application Ser. No. 697,742 filed Jan. 15, 1968, now Patent No. 3,539,996, by Mark W. Bee, Donald J. Lang and Alan D. Snyder, said copending application being assigned to International Business Machines Corporation.

The foregoing and other objects, features and advantages of the invention will be apparent from the following more particular description of a preferred embodiment thereof, as illustrated in the accompanying drawings.

INTRODUCTION

In order to provide a basis for understanding this invention, various aspects of an environmental data processing system wherein the invention may be used will first be described. Details of the environmental system which are not necessary to an understanding of this invention will not be described herein. For a description of such details, reference is made to the following publications, the contents of which are by this reference incorporated herein: IBM System/360 Principles of Operation, Form A22–6821–5; System/360 Model 50, Comprehensive Introduction, Form 223–2821; Microprogramming Manual for the IBM System/360 Model 50, IBM Technical Report TR00. 1479–1.

CENTRAL PROCESSING SYSTEM

Figure 1:
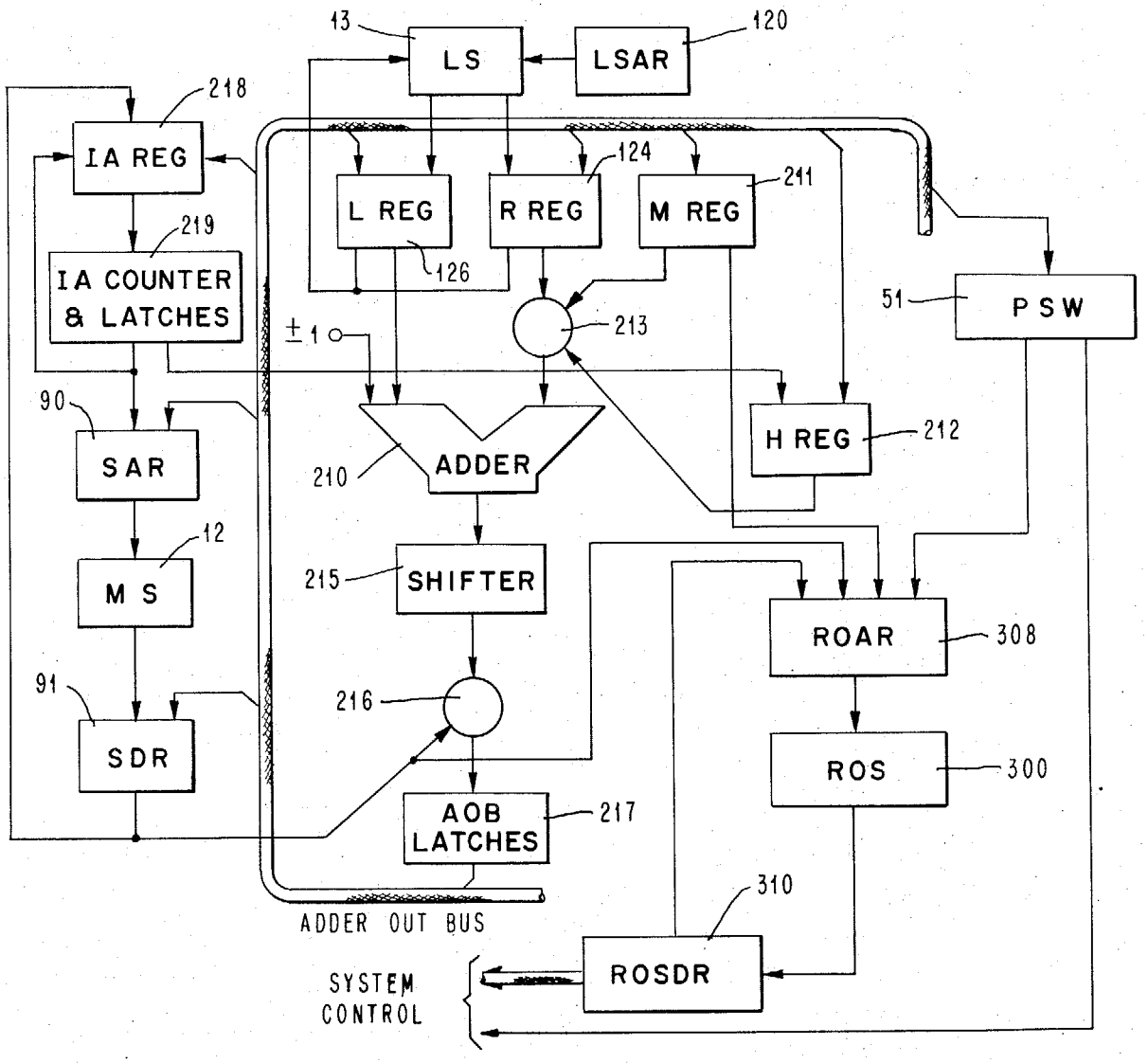
FIG. 1 is a schematic block diagram of an environmental data processing system wherein this invention may be used.

Referring to FIG. 1, there are shown several basic elements of an environmental digital computer system. The system comprises a read only control store (ROS) 300 with its associated address register (ROAR) 308 and data register (ROSDR) 310, a program status word (PSW) 51, a main storage unit 12, and a central processing unit. ROS, ROAR, ROSDR and PSW are elements of the central controls described hereinafter.

The central processing unit in FIG. 1 includes an adder 210 which receives an operand from the L register 126 and an operand from the R register 124, an M register 211 or an H register 212 through a gating network 213. The gating network 213 includes provision for complementing either of the operands, thereby affording the adder 210 the flexibility of adding or subtracting two operands. The output of the adder 210 is supplied through a shifter 215, and the output of the shifter may be shifted left or right 0, 1 or 4 places in any one CPU cycle. For a simple add or subtract operation, no shifttakes place. Where multiply or divide operations are performed, the output of the adder 210 may be shifted one or more places. The output of the shifter 215 is supplied through a gating network 216 to a group of latches 217 labeled adder out bus latches (AOB LATCHES). The output of the AOB latches 217 is applied to a bus labeled ADDER OUT BUS, and this bus supplies the output of the AOB latches to numerous destinations illustrated. The AOB latches 217 may be operated to supply data on the adder out bus to the storage data register 91, the storage address register 90, an instruction address (IA) register 218, the L register 126, the R register 124, the M register 211 and the H register 212. Information from the various sources in FIG. 1 have access to the adder outbus through the gating arrangement 216 and the AOB latches 217. Information from the L register 126, the R register 124, the M register 211 and the H register 212 may be supplied through the adder 210 and the shifter 215 in order to gain access through the gating arrangement 216 and the AOB latches 217 to the adder outbus. It is pointed out that data may be supplied through the adder 210 without modification and through the shifter 215 without a shift in position. Thus information from the L register 126, the R register 124, the M register 211 or the H register 212 may be supplied intact through the adder 210, the shifter 215, the gating arrangement 216 and the AOB latches 217 to the adder out bus, and this information may be supplied on the adder outbus to the various destinations enumerated above. Information in the storage data register 91 may be transferred directly to the read only store address register 308. Thus, it is seen that maximum flexibility is provided in transferring data from one selected location to a given destination.

The instruction address register 218 holds signals representing the address in the main store 12 of instructions to be executed. The address signals in the instruction address register 218 are transferred to an Instruction Counter and Latches 219. As successive instructions are performed, the instruction address is incremented by circulating the content of the IA register through the IA Counter and Latches and back to the IA register, thereby incrementing the value in the IA register. Each instruction is obtained by transferring the content of the instruction address counter 219 to the storage address register 90, and the instruction at a specified address is read from the main store 12 and supplied to the storage data register 91. The instruction stored in the storage data register 91 is transferred through the gating arrangement 216, the AOB latches 217 and the adder out bus to the M register 211. The instruction in the M register 211 has an address portion which is supplied to a read only store address register (ROAR) 308 which in turn supplies the address signals to a read only store 300. The read only store 300 provides output signals representing microinstruction codes which are stored in a read only store data register 310, the output of which is utilized by apparatus not shown to provide timed signals to operate the overall system under microprogram control. A portion of the output from the read only store data register 310 and a portion of the program status word 51 are supplied to the read only store address register 308 to determine the appropriate address. Read only store 300 and its affiliated controls are discussed more fully hereinafter.

CENTRAL CONTROLS

Figure 2:
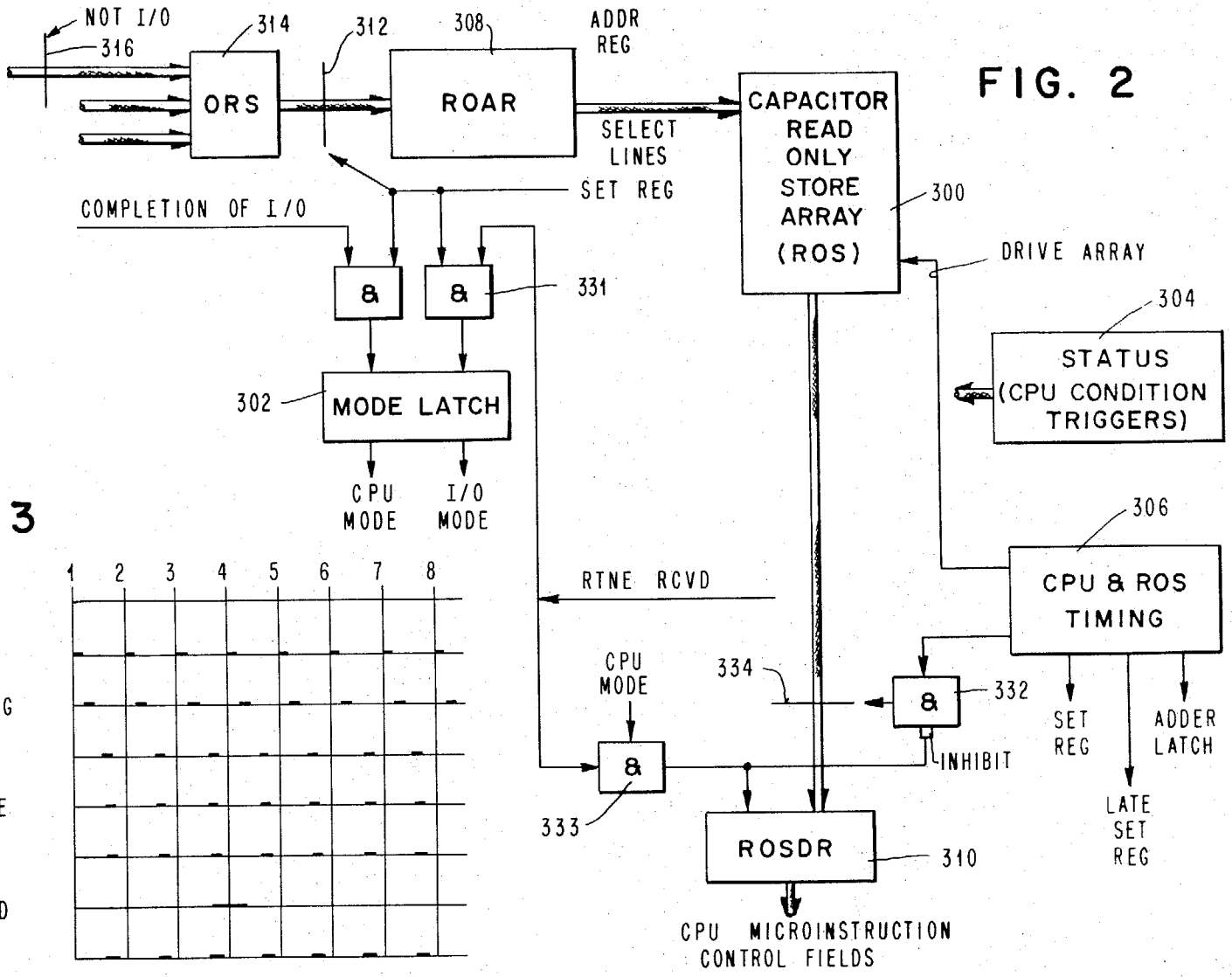
FIG. 2 is a diagram of the general organization of the sequence controls of the central processing unit.
Figure 3:
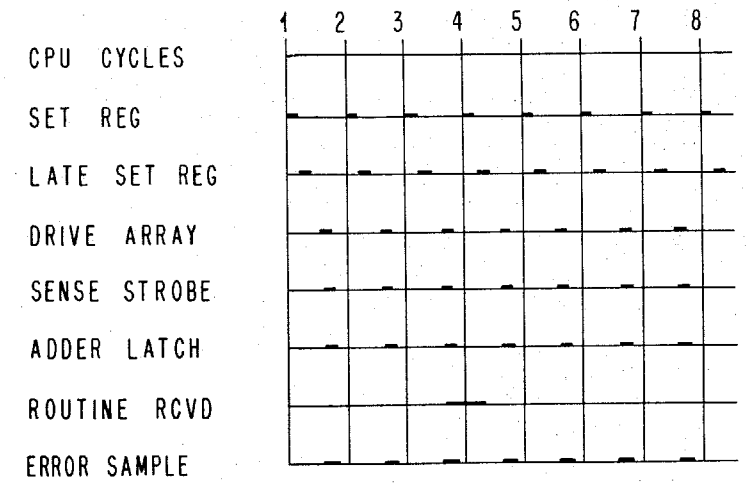
FIG. 3 is a time chart of the timing circuit 306 in FIG. 2.

Reference is made next to FIGS. 2 and 3 which show the central controls for the data processing system. The central controls include a capacitor read only store (ROS) 300 of the type described in an article entitled "Read Only Memory" by C. E. Owen et al. on pages 47 and 48 of the IBM Technical Disclosure Bulletin, vol. 5, No. 8, dated January 1963. The controls include a mode trigger 302, condition triggers 304, also known as STATS, and timing circuits 306. The timing circuits 306 produce five cyclic signals at the CPU frequency which are phased with respect to the zero time reference of each CPU cycle as shown in FIG. 3.

Data in the read only store is addressed by a twelve-bit selection register (ROAR) 308. Address signals for the ROAR may be taken from various sources including a portion of the output control information from the read only store data register (ROSDR) 310 in each CPU to select one of 2,816 ninety-bit control words and to enter the same in the read only storage data register 310. Each word, known as a microinstruction, is transferred into the read only store data register 310 at SENSE STROBE time which occurs just prior to the start of the next CPU cycle, and it controls the operation of the central processing unit during the next cycle.

The state of the read only store address register 308 is determined prior to the Drive Array pulse (FIG. 3) and controls the state of the read only store data register 310 at the following SENSE STROBE time. Thus, each entry into the read only store address register 308 usually controls the activity of the CPU in the next consecutive CPU cycle following the entry.

Each entry into the ROAR is determined in one of several different ways by the inputs presented to gates 312 through a network of OR gates 314. Ordinarily the 12-bits presented to the OR network 314 are derived selectively through gates 316 from one or more sources including: a segment of the ROSDR, and output conditions registered by selected conditions STATS 304 selected program branching information (program instruction operation codes).

The preceding discussion has presumed that the mode latch 302 is set to CPU mode and that CPU operation has not been interrupted by any input-output (I/O) units. Requests from I/O units are recognized by receipt of a Routine Received (RTNE RCVD) signal It may be seen from the inputs to the AND gate 331 in FIG. 2 that, if the CPU is in the CPU mode when a RTNE RCVD signal is received, the mode latch 302 is not set to the I/O mode until SET REG time of the cycle following the rise of RTNE RCVD. This permits the CPU to complete execution of the current microinstruction. If the CPU mode is up when the RTNE RCVD signal is received, the AND gate 333 is operated to provide an output level which is up, and this level inhibits the AND circuit 332, thereby suppressing the SENSE STROBE signal of sense gates 334 which normally supply input signals to the read only storage data register 310 from the read only store 300. This will permit the I/O request to be serviced in the manner described and claimed in copending application Ser. No. 573,246, filed Aug. 18, 1966 for Improved Program Suspension System by Matthew A. Krygowski and Thomas S. Stafford, now Patent No. 3,453,600, said patent being assigned to International Business Machines Corporation. Said Patent No. 3,453,600 is incorporated herein and made a part hereof by this reference.

MAIN STORE

Figure 4:
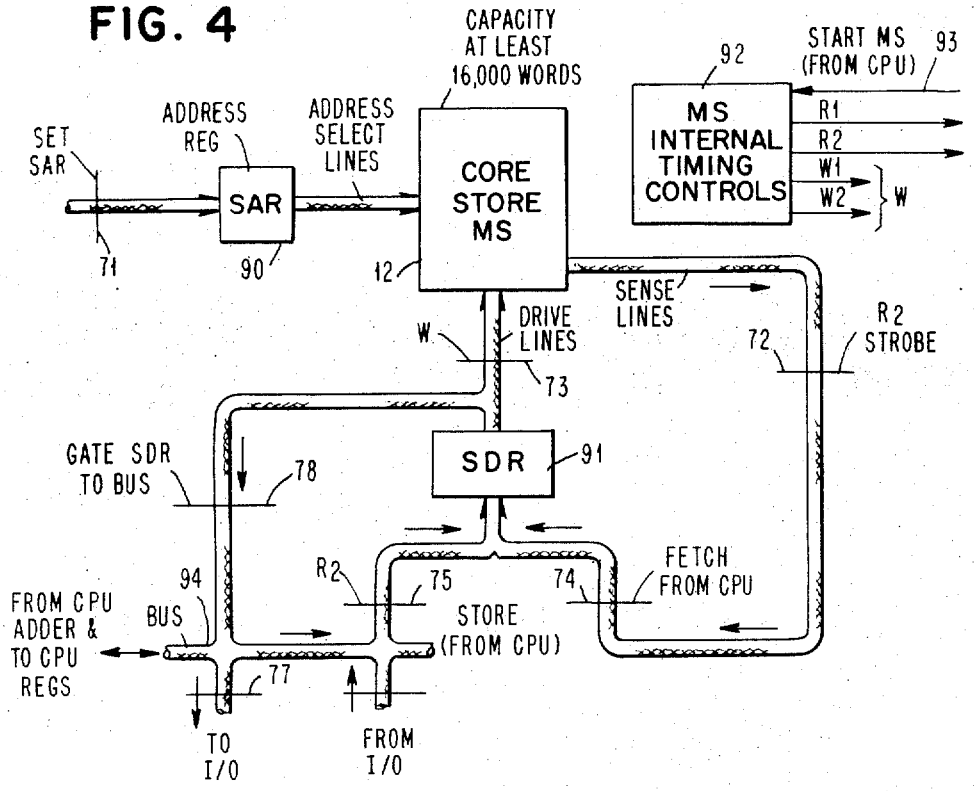
FIG. 4 is a schematic diagram of the organization of the main store.
Figure 5:
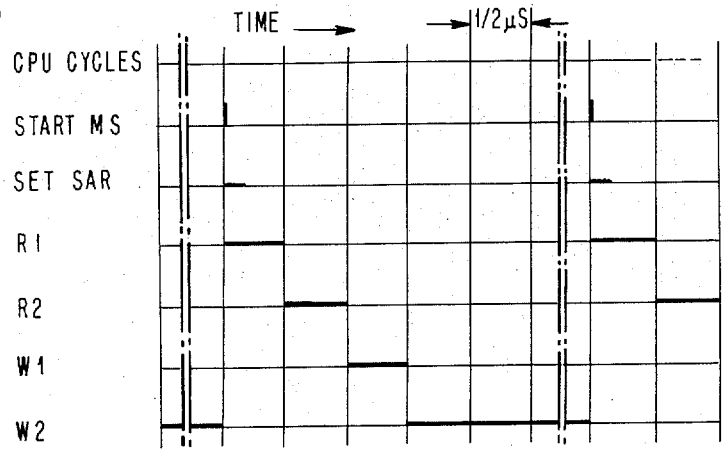
FIG. 5 is a timing chart used to explain store and fetch operations relative to the main store in FIG. 4.

Reference is made next to FIGS. 4 and 5 which illustrate in more dtail the main store 12, shown in block form in FIG. 1. FIG. 4 illustrates the system arrangement of the main store, and FIG. 5 illustrates the timing relationships involved. Referring more specifically to FIG. 4, gates 71 through 78 control the flow of information throughout the subsystem. The main store 12 is preferably a matrix array of magnetic cores, and a given address in the array is selected by signals in the storage address register (SAR). Address signals are supplied to the storge address register (SAR) 90 through a set of gates 71. 'he main store 12 has internal timing controls which repond to a start signal from the central processing unit, nd the main store then is operated through its basic ıemory cycle to read information on output sense lines ɔ a set of gates 72 from the selected address indicated by he storage address register. Information passed by the ates 72 is stored in a storage data register (SDR) 91. 'he data in the storage data register may be reinserted ı the main store by passing it through the set of gates 3, and the data in the storage data register may be suplied through the gates 78 to the central processing unit nd through further gates 77 to I/O units. Whenever a etch operation is performed, the gates 72 and 74 are oprated to transfer the information from the selected adress of the memory array to the storage data register 1, and the information thus read is reinserted through the ates 73 back to the selected address of the array during WRITE portion of the memory cycle. When a WRITE peration of new data takes place, the gate 72 and 74 re not operated, and the data read from the selected array is thereby lost. New data to be written into the seected address is inserted into the storage data register 1 through the gates 75 from the central processing unit r through the gates 75 and 76 from I/O units. The ew data is passed through the gates 73 to the selected ddress of the memory array during the WRITE portion f the memory cycle The main store 12 in FIG, 4 has a memory cycle hich is equal to four machine cycles of the central processing unit. As illustrated in FIG. 5, each cycle of the ıain store coincides with four cycles of the central processing unit. A memory cycle is initiated by a START MS ignal from the central processing unit, and during the first PU cycle the SET SAR causes the gates 71 to pass adress signals to the storage address register 90 in FIG. 4. During the first half of the memory cycle, signals R1 and 2 are generated as shown in FIG. 5. During the terıinal half of the memory cycle the signals W1 and W2 re generated as depicted in FIG. 5. During the time f R1 and R2 the main store performs a read operation, nd during the time of W1 and one cycle of W2 (noting hat W2 persists indefinitely until a new cycle of the main tore is started), the main store performs a WRITE opration, thereby reinserting in the selected address of the ıain store the same data read or inserting new data, s the case may be. The internal timing controls of the ıain store are indicated by the block 92 in FIG. 4. The TART MS signal is received on a line 93 whenever the ıain store is to perform a memory cycle. In response to he START MS signal, signals are generated on the lines ıbeled R1, R2, W1 and W2 at the times indicated in IG. 5.

In a fetch operation, signals on the sense lines of the ıain store MS are gated into the storage data register 1 during the R half cycle, and the contents of the storge data register are transferred to the selected internal ɔcation of the main store during the W half cycle. Thus, he fetched information transferred into the storage data egister is available for read out to circuits external to he main store, and this information is regeneratively reurned to the same place in storage, if it is not to be relaced with new information. In a store operation the ıformation appearing on the sense lines from the main tore is blocked, and other information is transferred hrough an external bus 94 in FIG. 4 to the storage data egister during the R half cycle of the main store. 'hereafter during the succeeding W half cycle the new ıformation in the storage data register is transferred to ıe internal location selected by the storage address egister 90.

LOCAL STORE

Figure 6:
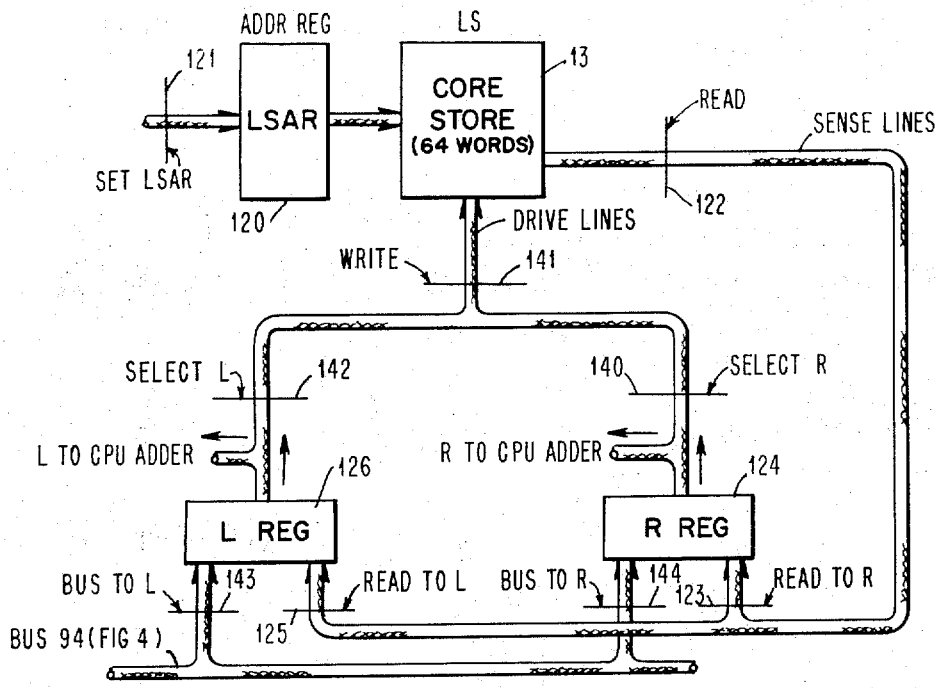
FIG. 6 is a schematic diagram illustrating the general organization of the local store.
Figure 7:
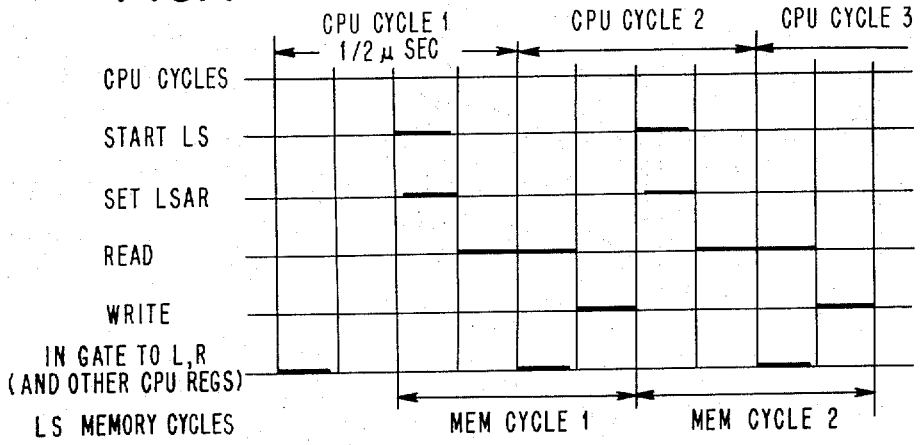
FIG. 7 is a timing diagram used to explain the operation of the local store and to contrast the timing of said operation with the main store timing of FIG. 5.

Reference is made next to FIGS. 6 and 7 which show the espective system arrangement of the local store and the timing relationship of its memory cycle. Referring more specifically to FIG. 6, there is shown a more detailed system arrangement of the local store which is depicted in block form in FIG. 1. The local store has 64 registers with each register capable of holding one word. A local storage address register (LSAR) 120 holds address signals representing a given one of the 64 register, and address signals are supplied to the local storage address register through a set of gates 121. Whenever a READ operation is performed, information from the selected address of the local store is supplied through a set of gates 122. The signals passed by these gates are supplied through a set of gates 123 to an R register 124 or through a set of gates 125 to an L register 126. The output of the L register or the output of the R register may be supplied to an arithmetic device or adder as has been described above. The output of the R register may be passed by a set of gates 140 and a set of gates 141 to the local store. The output of the L register may be supplied through a set of gates 142 and a set of gates 141 to the local store. Information may be supplied from the bus 94 to the L register and the R register through respective sets of gates 143 and 144.

The local store operates in a manner similar to the main store except that its cycle of operation is equal in duration to one machine cycle of the central processing unit. Also, there is more freedom of choice in the selection of information to be processed during the WRITE half cycle as pointed out more fully hereinafter. In the READ half cycle, information may be transferred from a selected address specified by the local storage address register 120 to one of the two buffer registers, the L register or the R register. In the WRITE half cycle the information in either the L register or the R register may be selectively transferred to the selected address of the local store. While information is being stored into the local store during a WRITE operation (i.e. in the second quarter of the next CPU cycle), the information previously carried from the sense lines into the L or the R registers may be progressively moved out to the CPU adder and from there to I/O units. Conversely, during the READ half cycle of the local store information signals propagating from I/O units toward the L or R registers may be progressively continued on their way during the subsequent WRITE half cycle of the local store 13.

The local store has a memory cycle of one-half microsecond. The memory cycle is equal in time duration to a machine cycle of the central processing unit, but the memory cycle is shifted timewise by 180 degrees with respect to the CPU cycle. This is readily seen in FIG. 7 by comparing the CPU cycle at the top of the diagram with the LS memory cycle at the bottom of the diagram. A START LS signal initiates a memory cycle of the local store, and as illustrated in FIG. 7 it commences at the mid-point of a CPU cycle. Address signals are set in the local store address register 120 in FIG. 6 during the initial phase of a memory cycle as indicated in FIG. 7. The READ portion of a memory cycle occupies 50% of the memory cycle with the mid-point of the READ portion of the cycle coinciding in time with the mid-point of the memory cycle, as shown in FIG. 7. The WRITE phase occurs during the last 25% of a memory cycle as depicted in FIG. 7. Ingating to the L register, R register and other CPU registers takes place, as indicated in FIG. 7, during the latter half of the READ phase of a memory cycle.

RETRY

In striving for 100% retryability of a function during the execution of which an error was detected, there are seven basic aspects which are considered herein: first, a record must be made of the function which was being executed at the time that the error was detected; second, residual effects of the error (such as the presence in a register of a word with incorrect parity) must be cleared up to prevent them from causing further error indications; third, certain condition and status indicators within the device must be restored to the state that they were in at a previous point in time when the device was known to be in an error-free state; fourth, all "source data" (i.e., all information within the system which was used as input information for the function to be retried) that may have been changed since the beginning of the previous unsuccessful attempt to execute the function must be made available in the condition it was in at said previous error-free state; fifth, retry of the function will be attempted; sixth, it is important that any apparatus used to accomplish the above should not degrade system performance when the data processing machine is running in the normal error-free condition; and seventh, retry itself should be retryable.

In general, the prior art approaches to retry have either ignored the problems involved in restoring changed condition and status indicators and changed source data or they have utilized complex and time consuming software (i.e., programming) techniques for performing the restoration. Additionally, many of the software techniques for retry do degrade normal system performance and are not themselves retryable.

When this invention is made a part of a data processing system, the seven aspects enumerated above are accomplished by the hardware of the system itself without the necessity of resorting to software. In fact, if an intermittent erroneous condition of the system causes an error to be detected, the system hardware will correct the error so rapidly that the programmer may be completely unaware that a system error has occurred. (Of course, the system can be caused to maintain a record of such errors for future diagnostic use.) The speed with which the system hardware corrects transient errors is so great that, in order to add even a minute to the total processing time of a job, several million intermittent errors would have to have occurred.

Various details of a preferred embodiment of this invention will be described below. The description will be primarily with respect to FIGS. 8a through 8f (hereinafter referred to collectively as "FIG. 8"). FIG. 8 shows elements that are aded to the basic environmental system by this invention. The figure also shows certain elements of the basic prior art system that are illustrated in FIG. 1 and were discussed with respect thereto. Elements that are common to both FIG. 1 and FIG. 8 have common reference numerals. Although the various elements shown in FIG. 8 may appear to be lacking in connection between them, it must be realized that all of the elements and interconnections therebetween that are shown in FIG. 1 are also implied in FIG. 8.

In order to completely understand the background of this invention and the exemplary prior art system in connection with which this preferred embodiment is described, reference is again made to the publications "IBM System/360 Principles of Operation" and "Microprogramming Manual for the IBM System/360 Model 50," said publications having already been incorporated herein by reference.

FUNCTION INDICATOR

As was mentioned above, the first basic consideration in any retry procedure is the preservation of an indication of the function that was being performed at the time that an error was detected. Before providing an operational definition of the term "function," it will be convenient to first define the terms "instruction" and "operation." An "operation" is herein defined as any step or steps that can be performed by a computer in one CPU cycle. In the environmental system herein described, an "operation" may also be defined to be equivalent of the responses of the computer system to a single word of the read only control store. An "instruction" is defined as any sequence of "operations" which accomplish a given result. Examples of "instructions" are: add; subtract; multiply; divide; branch unconditionally; branch if a given condition is true; transfer information from a specified register to storage; AND two words together; etc. (For example, the "instruction" MULTIPLY may be performed by an iteration of the "operations" ADD and SHIFT; etc.) A "function" can now be defined as a class of sequences of operations which can be successfully retried by a common retry control and which are characterized by their use of a common initial sequence control. The controls necessary to retry a given instruction depends upon the function (i.e., sequence of operations) that was being performed at the time that an error was detected. This is significant because more than one function may be performed during the execution of a single instruction.

In the case of the preferred embodiment herein implemented on an exemplary environmental system, we may consider four basic functions: Load; Wait; Status Fetch; and Normal. The system enters the Load function at the end of an input/output (I/O) routine when the channel turns control over to the CPU for the CPU to store status indicators. The system is regarded as entering the Wait function when entering the wait state or the halt state (discussed for example at pages 68 et seq. and 90 et seq. respectively, of the publications "IBM System/360 Principles of Operation," said publication already having been incorporated herein by reference) or when taking an external timer or I/O interrupt. The system is regarded as entering the Status Fetch function at the start of fetching a new status word during status switching. The system is regarded as entering its Normal function at the completion of either status switching or instruction execution.

From the above definitions of four functions, it will be clear to those skilled in the art that, in general, each of the functions would be controlled by a different portion of the sequence controls of a computer system.

Figure 8A:
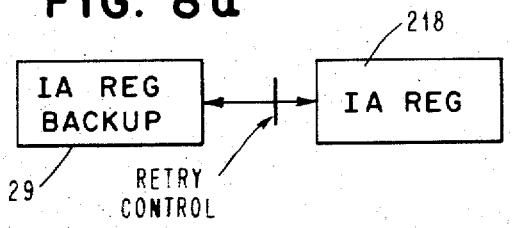
FIGS. 8a–8b is a schematic block diagram showing elements that are added to the environmental systems in accordance with a preferred embodiment of this invention.
Figure 8C:
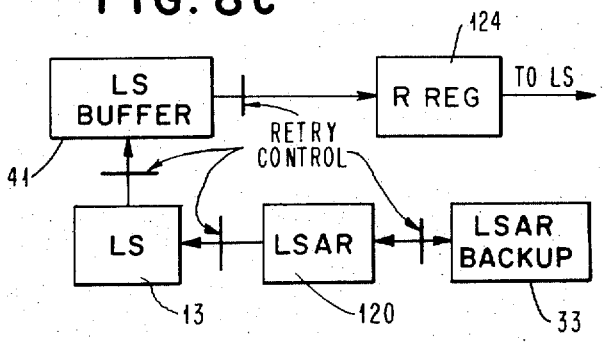
Figure 8B:
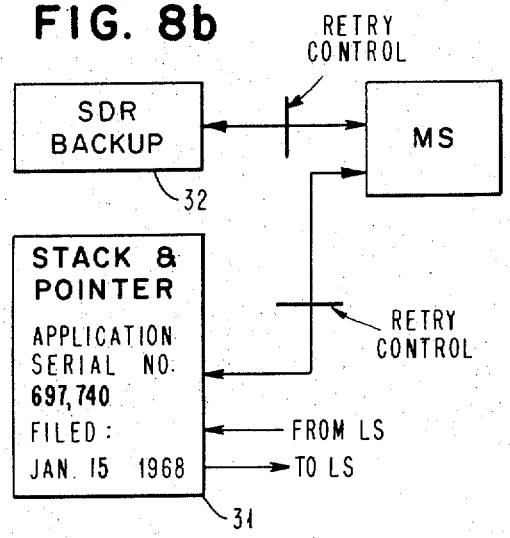
Figure 8D:
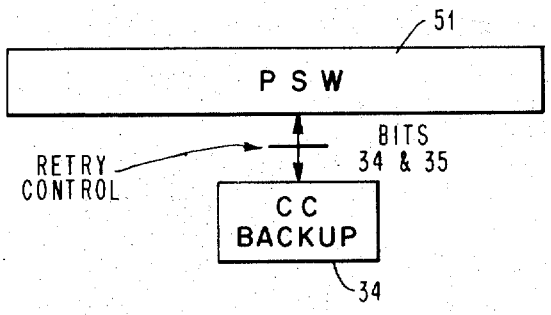
Figure 8E:
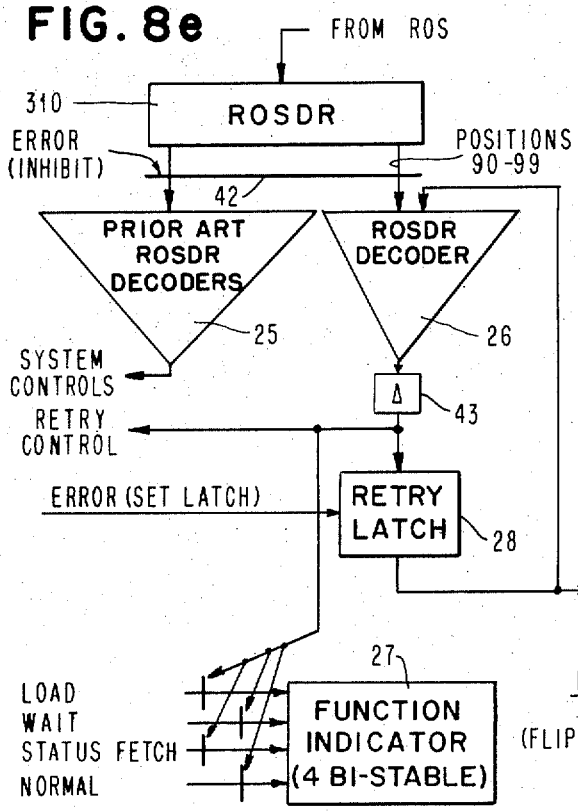

Referring now to FIG. 8e, there is shown a read only storage data register (ROSDR) 310 with associated ROSDR decoders 25 and 26. In the prior art environmental system each read only control storage (ROS) word contained ninety bits of control information and the ROSDR was ninety bit positions in length (i.e., bit positions 0–89). The decoder 25 is used to decode the first ninety positions of ROSDR. In a preferred embodiment of this invention each ROS word contains ten additional bits of control information (bits position 90–99) and the ROSDR 310 is expanded to be a 100 position register. The decoder 26 is added in order to decode the additional ROSDR positions. In order to maintain a current record of the function that is being executed by the CPU, a function indicator 27 is provided. In the preferred embodiment described herein, the function indicator 27 comprises a storage register consisting of four latches. The function indicator has four inputs, one for each of the latches. Each of the inputs can be gated to the function indicator by the output of the decoder 26 when it decodes an appropriate micro-order which has been gated into ROSDR 310 from the ROS. Each word in ROS that contains a micro-order which would cause the CPU to begin performing a new function will also contain, within bit positions 90–99 a micro-order which will cause a representation of the appropriate function to be gated into the function indicator. Setting the function indicator 27 to indicate a new function should be delayed by a delay means 43 in order to allow sufficient time for the error checking circuitry of the system to make sure that the previous function had been correctly executed. This precaution is desirable because an error that occurred during an attempt to execute one function might not be detected until after the beginning of execution of the next function. If this situation should arise, the delay means 43 will have prevented the function indicator 27 from being changed, and the system will be able to identify the function that was not correctly executed. Thus, the function indicator 27 will be updated, after it is known that a previous function was correctly performed, to contain an indication of the function currently being performed by the CPU.

As will be well understood by those skilled in the art, in one embodiment of a four-latch indicator as described above, each input to the function indicator will control the setting of one of the latches. Thus, in order to set all of the latches to represent a given function, the decoder 26 will generally be required to furnish a signal to a gate on the input line that controls each latch. Since each function is indicated by a specified condition of all of the latches, all four gates of a four-latch indicator would have to be conditioned by the decoder 26 in order to set a function indication. In FIG. 8e the function indicator 27 has been shown as having one gated input for each function that may occur. It will, however, be recognized that FIG. 8 presents a simplified representation of the function indicator 27 and its controls, and that the above description presents a more accurate description of an exemplary implementation of the function indicator.

It is also noted that the preferred embodiment of the function indicator uses four latches despite the fact that such an implementation is capable of representing sixteen distinct states while, in the exemplary environmental system herein disclosed, only four different functions need be indicated. Utilization of a function indicator which is capable of having a larger number of states than there are functions yields two primary advantages. First, it is a simple and inexpensive way of detecting erroneous settings of the function indicator (due, for example, to a faulty latch). Second, it will facilitate an expansion of the number of functions which the system can perform and which might need to be retried.

Additional details that may be necessary for implementation of the function indicator and the manner in which it is set by its associated controls are well known in the art and are discussed, for example, in the two references previously cited in this section.

Figures 9, 10:
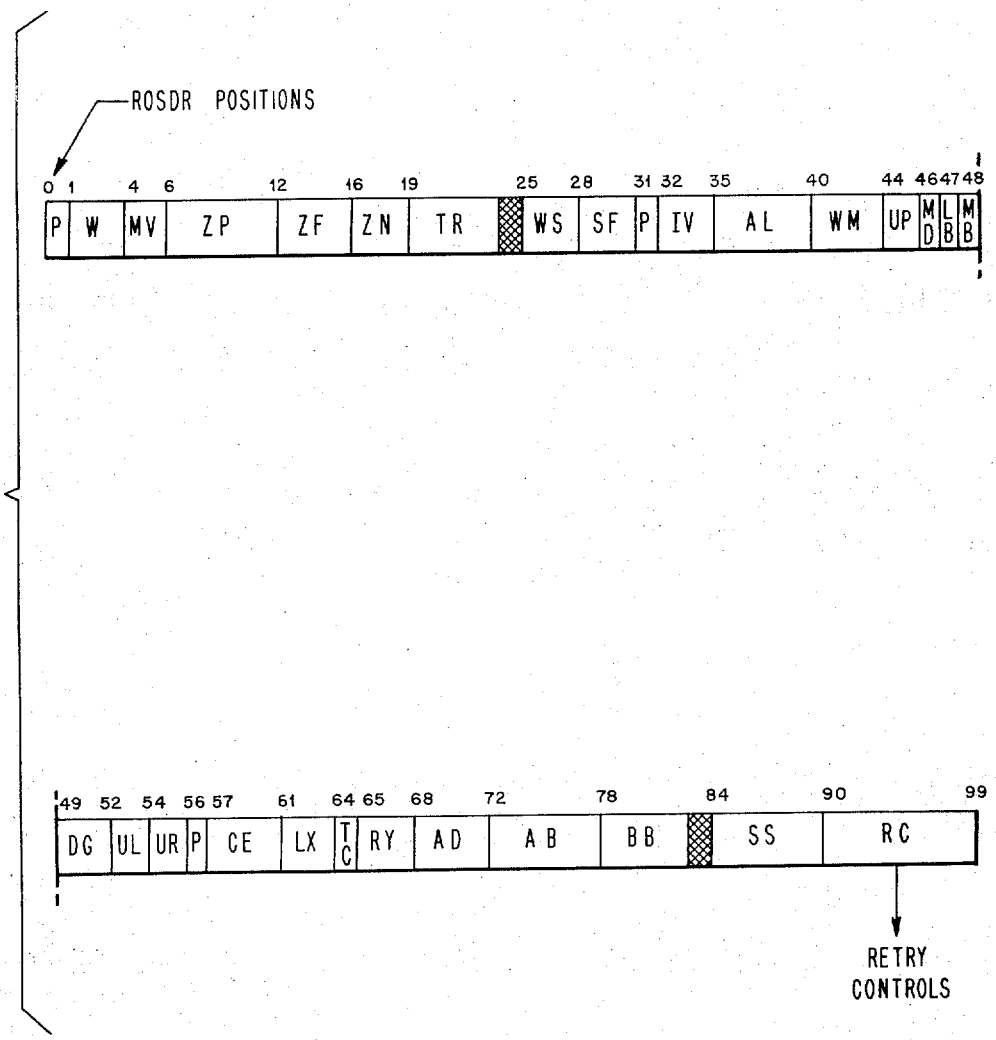
FIG. 9 shows the various fields of a read only control storage data register (ROSDR).
FIG. 10 shows further details of retry control fields within a ROSDR.

Referring to FIG. 9, the read only storage data register is shown and its various control fields are identified. The function of each of the various ROSDR fields is identified in the following table:

| ROSDR | ROSDR bit | Function of field |
|---|---|---|
| P | 0 | Parity of bits 0-30. |
| MU | 1-3 | Left input to mover. |
| MV | 4-5 | Right input to mover. |
| NP | 6-11 | Bits 0-5 of next ROS address. |
| NF | 12-15 | Source of bits 6-9 of the next ROS address or function branch control. |
| NN | 16-18 | Address control field. |
| NR | 19-23 | Destination of adder latch contents. |
| | 24 | Spare. |
| VS | 25-27 | Source of local storage address. |
| LF | 28-30 | Local storage function. |
| P | 31 | Parity of bits 32-55. |
| V | 32-34 | Invalid digit test and instruction address register control. |
| AL | 35-39 | Shift control and gating into adder latch. |
| VM | 40-43 | Mover desination. |
| JP | 44-45 | Byte counter function control. |
| MD | 46 | MD counter control. |
| LB | 47 | LB counter control. |
| MB | 48 | MB counter control. |
| LG | 49-51 | Length counter and carryinsertion control. |
| JL | 52-53 | Mover function—left digit. |
| JR | 54-55 | Mover function—right digit. |
| P | 56 | Parity of bits 57-89. |
| EE | 57-60 | Emit field (used as data). |
| AX | 61-63 | Left input to adder. |
| AC | 64 | True/complement control of left adder input. |
| AY | 65-67 | Right input to adder. |
| AD | 68-71 | Adder function. |
| AB | 72-77 | Condition branch test A (furnishes bit 10 of next ROS address). |
| BB | 78-82 | Condition branch test B (furnishes bit 11 of next ROS address). |
| | 83 | Spare. |
| BS | 84-89 | Stat setting and miscellaneous control. |
| RC | 90-99 | Retry controls. |

FIG. 10 shows the function of the three ROSDR fields that are contained in the added positions 90–99 of ROSDR. Because each of these new fields can be decoded in either of two modes (CPU Mode or Retry Mode), each field can serve two functions. This aspect of the added fields will be described in more detail hereinafter.

Further details of the manner in which the above fields may be used to control the environmental system are described in said Microprogramming Manual for the IBM System/360 Model 50, particularly at pages 26–36. The operations to be controlled by the retry control field are further described hereinafter.

RETRY CONTROLS

As has already been described, in order for instruction retry to be practical, it will often be necessary to save source data that may have been destroyed between the time that execution of an instruction was initiated and the time that an error was detected. The term "source data" refers to all information (such as operands and status and control indicators) upon which the function acts or upon which the function may depend for complete control of its execution. (It will, of course, be understood that a "function" will often be an "instruction.")

In order to know what source data must be saved, the various instructions which can be performed by the computer system must first be analyzed. Various groups of the instructions which can be performed by the environmental system will be discussed below only to the extent to which they affect this invention. For further information about the instructions, see "IBM System/360 Principles of Operations" said publication having already been incorporated herein by reference.

BRANCH, COMPARE AND RR LOAD INSTRUCTIONS

Execution of these instructions destroys no source operand fields. The source data necessary to retry these instructions comprises the instruction address, and the condition codes upon which some of the instructions may depend for their execution.

RR, RX, RS (SINGLE-WORD OPERAND)

This group of instructions includes the AND, the OR, the EXCLUSIVE OR, and the ADD and SUBTRACT instructions. These instructions take first and second operands, compute, and store the results into the address previously occupied by operand 1 of local store. If an error is detected after the result is stored, the instruction cannot be retried until operand 1 has been restored to its previous condition. The address of the instruction will also be needed.

RR, RX, RS (DOUBLE-WORD OPERAND)

Also included within this major class of instructions are all of the FLOATING POINT, all of the SHIFT DOUBLE and some MULTIPLY and some DIVIDE instructions. Before the time that an error is detected in the execution of one of these instructions, two words of local store source data may have been destroyed. Both of the source data words must then be restored before retry. The address of the instruction will also need to be restored.

SI

In the environmental system herein disclosed, this group of instructions includes only the three instructions AND, OR and EXCLUSIVE OR. When an error is detected during the execution of one of these instructions, a source operand in main store may have already been destroyed. One way of retrying the instruction would be to save the address of the operand that was destroyed as well as the operand itself, restore them both, and then retry. In the preferred embodiment herein described, the operand address need not be saved because, on retry, the saved operand itself is used instead of the operand word in storage. However, the address of the instruction will still be needed.

SS

This group of instructions, in the environmental system herein described, includes eight of the decimal instructions. By the time an error is detected, up to sixteen bytes of source operand may have been destroyed. Although there are only four bytes per storage word, the source operand that was destroyed might have been distributed over as many as five words. For example, the source operand that was destroyed might have consisted of one byte of a first word, all of a second, third and a fourth word, and three bytes of a fifth word. Further details about these instructions, and about the precise manner in which the required number of words of main source data are saved and, if an error is detected, restored to main store, are found in application Ser. No. 697,740 filed on Jan. 15, 1968, now Patent No. 3,533,082, "Source Data Change Instruction Retry" by D. L. Schnabel and A. D. Snyder and assigned to International Business Machines Corporation. Said copending application is incorporated herein and made a part hereof by this reference. In addition to the above, the address of the instruction will be needed.

SS VARIABLE FIELD LENGTH

By the time that an error is detected during the execution of one of these instructions, up to 256 bytes of source operand could have been changed. The apparatus described in the last-mentioned copending patent application may be used to restore the source operand. However, a better technique for saving variable field length source data is shown in copending application Ser. No. 698,595, "Instruction Retry Byte Counter" filed on Jan. 17, 1968, by D. J. Lang et al. (now Patent No. 3,564,506) and assigned to International Business Machines Corporation. In addition, the instruction address and system status and control indicators will need to be saved.

I/O

Input/output instructions are retryable by the apparatus herein described up to a threshold, and from that point on must be re-executed through the use of intervening software (because of the possible necessity of physical movement to restore such I/O devices as magnetic tape drives, card readers, etc.). However, even when additional software is used for retry of input/output instructions, this apparatus will make available to the software a valid unit address, a command address and a position code for use in the retry procedure. For further details with respect to I/O instructions, reference is made to copending application Ser. No. 697,797 filed Jan. 15, 1968, now Patent No. 3,564,502 and assigned to International Business Machines Corporation, said copending application being incorporated herein and made a part hereof by this reference.

Figure 8F:
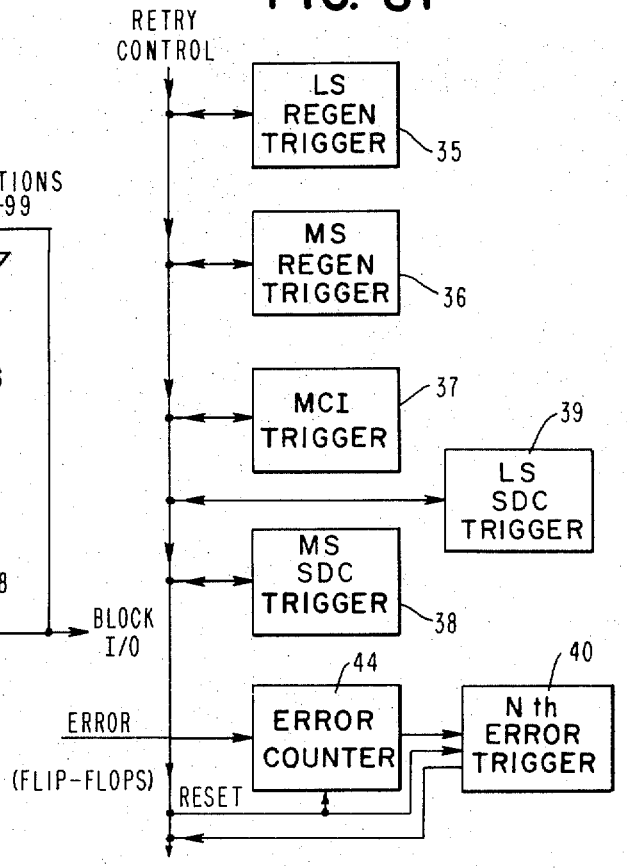

Referring to FIGS. 8a–8f, there are shown various elements which must be added to the environmental system of FIG. 1 in order to accomplish instruction retry. It will be recognized by those skilled in the art that the elements shown in FIGS. 8a–8e are connected by the data paths that were previously described in connection with FIG. 1. The elements shown in FIG. 8f are in data paths that have been added for purposes of retry control. FIGS. 8a–8f will be collectively referred to hereinafter as "FIG. 8." In FIG. 8, many of the lines which represent data flow between various elements of the system have short perpendicular lines drawn across them. These perpendicular lines represent gates which are used to control the transfer of information between elements of the system. All of the gates shown in FIG. 8 are conditioned by the retry controls with the exception of gate 42 (FIG. 8e) about which more will be said hereinafter.

In order to save the address of an instruction which might have to be retried, a supplemental (backup) instruction address register 29 is provided. Another address which may be needed for restoration of source data and/or retry of the instruction is the local store address which was contained in the local store address register (LSAR) 120, and which may have been destroyed before an error was detected. In order to save the local store address, an LSAR backup register 33 is provided. In the event that it becomes necessary to restore data into local store (LS) 13, an LS buffer 41 is also provided. In the environmental system herein described, the LS buffer 32 need be only one word in length. For restoration of data into the main store (MS) 12, a storage data register (SDR) backup 32 is provided. If it becomes necessary to restore in MS 12 source data, apparatus 31 which comprises a stack buffer and means indicting where in the stack buffer various words have been stored will be used. Further details of the apparatus 31 are disclosed in previously referenced application Ser. No. 697,740 filed Jan. 15, 1968, now Patent No. 3,533,082 for "Source Data Change Instruction Retry," by D. L. Schnabel and A. D. Snyder and assigned to International Business Machines Corporation. In order to save machine status indications upon which an instruction to be retried must rely, a condition code (CC) backup register 34 is provided. In the environmental system herein described, the CC comprises bit positions 34 and 35 of the PSW 51. In order that the smallest possible number of extra bit positions be added to ROS and to ROSDR, it is desirable that micro-instructions contained in the added ROS and ROSDR fields be susceptible to being decoded to perform different operations at different times. To enable accomplishing this, a retry latch 28 which can be set and reset by the output of the ROSDR decoder 26 is provided. The output of the retry latch 28 will, after a suitable delay, be used to indicate the mode (i.e., CPU mode or retry mode) in which the system is running, and will influence the manner in which microinstructions are decoded. This is shown in FIG. 8e in a symbolic manner by feeding the output of the retry latch 28 to the input of the ROSDR decoder 26. It is noted here that the retry latch may be set by the decoder 26 even when no error condition exists. This may be done whenever it becomes desirable to activate the alternative decoding mode of decoder 26. In order to keep track of whether or not, at the time that an error was detected, information was being regenerated back into local store or into main store, a local store regeneration trigger 35 and a main store regeneration trigger 36 are provided. In case it is desirable to inhibit retry and take a normal Machine Check Interrupt (MCI) under certain conditions, a MCI trigger 37 is provided. The MCI trigger 37 may be set and reset, and tested by the microinstructions that have been added for retry control. Since source data need not be restored unless it has actually been changed before an error was detected, a main store source data change (MS SDC) trigger 38 and a local store SDC trigger 39 are also included. The SDC trigger 38 or 39 will be set by the output of the ROSDR decoder 26 when source data is changed during the execution of an instruction. The SDC triggers will be reset at the beginning of the execution of any instruction. Because even solid errors will initiate an attempt to retry an instruction, it is desirable to have an error counter 44 and an Nth error trigger 40 to indicate that retry of an instruction has been attempted a predetermined number (N) of times. After retry has been attempted N times the error will be assumed to be a solid error, and a Machine Check Interrupt will normally be taken. Also added in the preferred embodiment of this invention is an inhibit gate 42 at the output of the ROSDR 310. In the event that an error is detected, the gate 42 will serve as part of the means used to force the retry controls to assume control of the data processing system. In the environmental system, errors are detected only at a specific time in the CPU cycle by an Error Sample signal (see FIG. 3) which queries the various error latches. For this reason, an error which may have occurred late in the CPU cycle will not be detected until the following cycle. In order for the retry controls to be effective, means must be provided to enable the retry controls to save source data (and retain an indication of a function) until such time as the previous function is known to have been successfully completed. In the preferred embodiment herein described, said means comprises a delay 43 at the output of the decoder 26. Delay 43 delays the output of decoder 26 from taking ffect until all errors that may have occurred during the revious CPU cycle have been detected.

OPERATION—IN GENERAL

The existence of a machine error (which may have ocurred during a previous CPU cycle), if one has occurred, vill be detected slightly more than half way through a CPU cycle when an Error Sample signal (see FIG. 3) queries the various error latches of the system. In the nvironmental system, this signal is produced after slightly more than half of a CPU cycle has been completed. If ny machine malfunctions have occurred, an ERROR signal will come up. The ERROR signal will be used to turn ontrol of the data processing machine over to the retry ontrol system. In the preferred embodiment described erein, the basic retry controls are implemented in a read nly control store (ROS) beginning at ROS location zero. n order to force the machine to take its next command rom ROS location zero, the ERROR signal is fed to an nhibit gate 42 (FIG. 8e) to prevent the contents of ROSDR 310 from reaching the ROSDR decoders 25 and 6. The ERROR signal also stops the running of the CPU lock for one CPU cycle. Thus, during the CPU cycle ollowing the detection of an error no information will e gated to the ROS address register (ROAR). This "no nformation" condition will be interpreted by ROAR as eing the equivalent of all zeros, and this will cause the vord located at ROS address zero to be gated into the ROSDR to cause the retry controls to take control of the ystem. In the preferred embodiment of the invention, the ERROR signal is also utilized to set the retry latch 28 o condition the decoder 26 to recode micro-instructions n the retry mode, and the ERROR signal is also used to ncrement the error counter 39 (FIG. 8f). The retry controls will then test the machine check interrupt (MCI) rigger 37 and the Nth error trigger 40 to see if either as been set. These tests may be performed in the same nanner that is normally used in the prior art to test the etting of various triggers. The MCI trigger will have een set, if for some reason, retry is not desired; the Nth rror trigger will have been set to signal the presence of a olid error condition if retry of the function during the xecution of which an error had been detected had been ttempted N times. If either of these triggers is set, a machine check interrupt will be taken in the manner normally used by the prior art environmental system.

The retry controls will then eliminate various residual ffects that may have been caused by the detected error. During the time that this is being done, it will generally e desirable to disregard data error indications (caused, or example, by bad data presently in a register) and to revent I/O requests from breaking in. This is accomlished by setting an ignore error trigger that exists in the rior art environmental system and using the output of etry latch 28 to inhibit I/O break-in (see application Ser. No. 573,246, now Patent 3,453,600, for further details rearding I/O break-in). The H, L, M and R registers are hen cleared to remove ay erroneous data that may be n them. After this point, the ignore error trigger is turned ff in order to permit future error indications to restart he retry controls and a memory cycle is started. If the etected error occurred during a memory cycle, the main torage regeneration (MS REGEN) trigger 36 will have een set. If the trigger is not on, the retry controls will eset the storage address register (SAR) 90 (FIG. 1). If he trigger is on, the word in the storage data backup register 32 (FIG. 8b) will be written back into main storage. Any future error conditions that are sensed by the data rocessing system will cause the above steps (i.e., set retry atch, increment error counter, take next control word rom ROS location zero, etc.) to be redone. This ability f the retry control system to "re-enter" itself from points within itself is one of the significant advantages of this etry control system. It is this feature which enables this etry control system to overcome the effects of machine malfunctions which may occur while the retry control system is in control of the data processing system, and this feature also provides the ability to overcome the effects of error conditions which, although transient, may exist for several machine cycles. Only after retry of a machine function during the execution of which an error was detected has been attempted a predetermined number (N) of times, will the error be classified as solid and a machine check interrupt be taken.

The next step to be performed by the retry controls will be interrogation of the local store regeneration (LS REGEN) trigger 35 to see if the detected error occurred during a local store cycle. If the LS REGEN trigger 35 is set, the local storage word that has been saved in the LS buffer 41 will be gated to the R register 124, from where it will be regenerated into local store 13 (FIG. 8c).

Up until this point, the retry controls perform the steps enumerated above irrespective of the function that the system was attempting to execute at the time that an error was detected. Following this point, the steps to be taken by the retry controls will depend upon the function that was being executed at the time that an error was detected. As has been described above under the heading "Function Indicator," there are four functions of concern in this environmental system: Load; Wait; Status Fetch; and Normal. The retry controls will test the function indicator 27 to determine which function was in the process of execution. The following four paragraphs describe the operations performed by the retry controls depending upon the function specified by the function indicator.

NORMAL FUNCTION

If the function indicator 27 is set to Normal, the retry controls will query the local store source data change (LS SDC) trigger 39 to determine whether or not any source operands contained in local store 13 have been changed. If the LS SDC trigger is set, the local store source operands will be restored from the stack buffer 31 (FIG. 8b). For a preferred embodiment of apparatus to accomplish the restoration, reference is again made to copending application Ser. No. 697,740, filed Jan. 15, 1968, Patent No. 3,533,082 for "Source Data Change Instruction Retry," by D. L. Schnabel and A. D. Snyder and assigned to International Business Machines Corporation. After restoring source operands to the local store (or immediately after testing the LS SDC trigger 39, if the trigger was off) the retry controls will cause the address of the original instruction to be gated from the instruction address backup register 29 to the instruction address register 218 (FIG. 8a) and will cause the saved condition code (CC) contained in the CC backup register 34 to be gated to bit positions 34 and 35 of the program status word (PSW) 51 (FIG. 8d). The retry controls will then reset the retry latch 28 and return control of the data processing system to that portion of the CPU which will refetch and attempt to execute the instruction specified in the instruction address (IA) register 218. This will be the same instruction that the system tried to execute previously. The manner in which instructions are fetched, decoded and executed by the environmental system is described in the various references that have been cited above and need not be described herein.

STATUS FETCH FUNCTION

If an error was detected during an attempt to fetch a new PSW, the address of the new PSW will have been stored in location 2 of local store 13. The retry controls will access the address of the new PSW, reset the retry latch 28, and fetch and load the new PSW. The retry controls will then, because the function has now been completed, set the function indicator 27 to Normal, reset the triggers 35–38, and reset the error counter 39 to zero. Control of the system will then be returned to the CPU to fetch the instruction specified by the PSW, the address of which is in the IA register 218.

WAIT FUNCTION

When the Wait function is indicated by the function indicator 27, the retry controls will first restore the previous contents of the IA register 218 and the CC bits of the PSW 51 from their respective backup registers 29 and 34 and then reset the retry latch 28. The function indicator 27 will be set to its Wait indication, the triggers 35–39 will be reset, the error counter 44 will be reset and control of the data processing system will be returned to the CPU.

LOAD FUNCTION

The function indicator 27 was set to Load at the end of the standard I/O load routine at the time where the channel stores data into the L, R and M registers and turns control over to the CPU for the CPU to store the status in the PSW. At the same time that status was being stored into the L, R and M registers, it was also being stored in the stacks 31. If the Load function is indicated, the retry controls will cause the status information in the stack 31 to be restored into the L, R and M registers. The previous contents of IA register 218 and the CC bits of the PSW will be restored from their respective backup registers 29 (FIG. 8a) and 34 (FIG. 8d). The retry latch 28 will then be reset. Control of the data processing system will then be returned to the CPU for retry of the Load function.

In the above description of retry of various functions performed by the environmental system, no attempt has been made to dissect the retry of each individual instruction that may be performed by the data processing system. As is well known to those skilled in the art, different data processing systems often utilize different instruction sets which can be divided into different functional groups. However, the above description of the operation of the hardware of which this preferred embodiment is comprised, when added to the ordinary background knowledge of the data processing system design art, will be sufficient to teach those skilled in the art to implement this invention on a variety of data processing systems.

In the above descriptions of the steps that are performed under retry control, it was assumed that no error conditions interrupted the sequential performance of the steps above specified. However, it is significant to note that, if any error condition had arisen during the performance of the above steps, the steps of retry control would have been reinitiated from the beginning. Thus, the retry control system can be entered from any part of the CPU and from itself. The ability to recover from errors that are detected while the retry controls are in control of the data processing system is one very significant advantage of this invention.

It will of course be recognized by those skilled in the are that various modifications may be made to the preferred embodiments of the invention as described above without departing from the spirit and scope of this invention. For example, the invention could be used on a "conventional sequential-logic" data processing machine which does not have within it a read only control storage. Such an implementation would generally require a expansnion of the control logic of the computer. This expansion would be necessary in order to provide means for saving all of the information that might be required for retry without affecting the normal error-free operation of the computer. In order for the saving of source data not to effect system performance, it must be done in parallel with the normal operation of the machine. It is this requirement that will make it necessary to expand the machine's control logic. Upon detection of an error, the machine could use conventional interrupt techniques to enter a retry mode and perform all restoration steps that may be necessary for retry of the function during the execution of which the error was detected.

Another embodiment of the invention in a data processing system similar to the prior art environment system herein disclosed, could include error correction circuitry associated with the main store and the local store. Implementation of this is shown in FIGS. 11 and 12.

Figure 11:
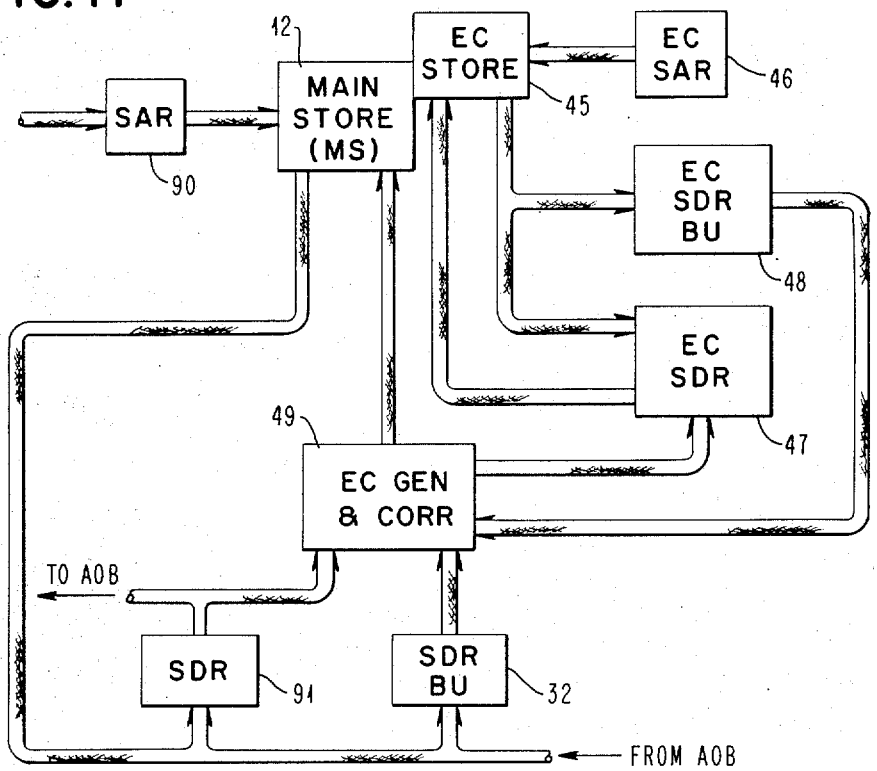
FIG. 11 shows elements that may be added to the main store for storage error correction.
Figure 12:
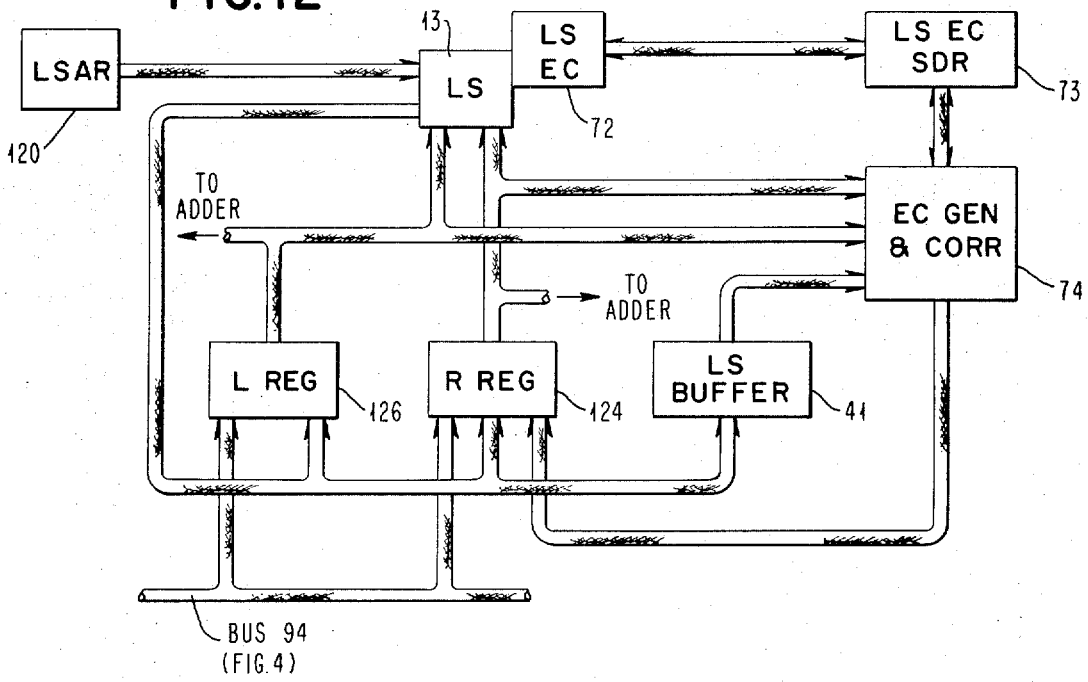
FIG. 12 shows elements that may be added to the local store for storage error correction.

Referring to FIG. 11, a preferred implementation of error correction circuitry for the main store is shown. In addition to various elements already described (and which are referenced by the same reference numerals previously used) there is provided an additional error correction (EC) store 45 with an associated storage address register 46. Because of timing conditions within the environmental system, the timing of EC store 45 is skewed from the timing of the main store (MS) 12 by an amount of time equal to the time that is required for the generation of error correction information. Also associated with the EC store 45 are storage data registers 47 and 48. In order to calculate redundant bits to be used in the error correction process, and to perform error correction, an EC generator and corrector 49 is provided. The unit 49 will, in accordance with a predetermined error correcting code, generate redundant bits for use in error correction as information is passed through it on the way to storage. It will be recognized by those skilled in the art that, instead of a single device 49, two separate devices could be used for generation of redundant bits and for correction of erroneous storage words. Various implementations of such a device are well known in the art and need not be further described herein.

STORE

In a Store operation, the data in the SDR 91 will be gated unchanged through the EC generator and corrector 49 to MS 12. Data in the SDR 91 will also be gated to the EC generator and corrector 49 which will generate error correction information (ECI). The ECI will be gated to the EC SDR, and from there to the EC store 45 at a location therein specified by the EC SAR 46. The ECI can then be utilized to correct errors in stored data. In a preferred embodiment of this invention, both of the stores 12 and 45 comprise core memories that are identical. The EC SAR 46 will address the EC store 45 by utilizing the same address that is contained in the SAR 90. All of the above operations are controlled in the same manner as the operations discussed in previous sections.

READOUT

When information is fetched from MS 12, it will go via the data path shown to SDR 91 and to SDR BU 32. Also, the ECI which corresponds to the word which has been fetched from MS 12 will be read out from the EC store 45 to EC SDR 47 and EC SDR BU 48. The data in SDR 91 will be gated to the EC generator and corrector 49 and ECI will again be generated. The ECI generated for the word contained in SDR 91 will be compared to the ECI contained in EC SDR 47. If they are equal, the fetched word will be presumed to be correct. If they are not equal, an error latch will be set and the retry controls will assume control of the data processing system. So that the EC generator and corrector 49 may determine which bit (or bits) was in error, the ECI contained in the EC SDR BU 48 and the data word contained in SDR BU 32 will be gated to the EC generator and corrector 49. The EC generator and corrector 49 will produce an indication of which bits were in error. The word contained in the SDR BU 32 will be gated through the corrector 49, corrected, and restored in MS 12. Appropriate ECI will be gated from the corrector 49 to the EC SDR 47 and from there to the EC store 45. The function during the execution of which the error was detected can now be retried.

Referring to FIG. 12, a similar error correction arrangement is shown for the local store (LS) 13. As data are gated from the L register 126 or from the R register 124 to the LS 13, the data will also be gated to an EC generator and corrector 74 where ECI will be generated and sent to the LS EC SDR 73 from where it will be gated to the LS auxiliary storage (LS EC) 72. The timing of LS EC 72 is skewed from the timing of LS 13 by an amount equal to the time needed to generate ECI.

When information is read from the LS 13 to either the L register 126 or to the R register 124, it will also be read into the LS buffer 41. At the same time, the ECI contained in the LS EC store 72 will be gated to the LS EC SDR 73. The data contained in the LS buffer 41 will be gated to generator 74 where ECI will be recalculated and compared to the ECI in the LS EC SDR 73. If they are equal, the data read from LS 13 will be presumed to have been correct. If they are unequal, then the data contained in the LS buffer 41 will be corrected in the manner described above with respect to the MS 12 shown in FIG. 11. The corrected data will be restored into LS 13 through the R register 124 and the ECI will again be stored in the LS EC memory 72.

With the added error correction capabilities shown in FIGS. 11 and 12, the system herein described will be able to recover from errors caused by intermittent malfunctions of bits in main store or in local store.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system including a central processing unit, sequence controls and sources of data, said system being capable of performing functions to modify said data, said system also including error detection means to detect the occurrence of an error during the performance of one of said functions; execution retry controls comprising:

a plurality of saving means for saving source data that could be modified during the performance by said system of a function, said saving means being capable of retaining an indication of the original form of data appearing in said sources of data at the time that performance of said function began, said saving means being capable of retaining said indication until performance of said function has been completed;

selectively operable data paths connecting said saving means with said sources of data; [and]

means to operate said data paths at predetermined times to cause source data to be saved in said saving means in anticipation of the possible occurrence of and error [.]; *and*

*selectively operable change indicating means for indicating that data contained in at least one of said sources of data has been modified.*

2. The execution retry controls of claim 1 wherein one of said sources of data is a memory and additionally comprising:

regeneration indication means settable in response to said sequence controls during a memory cycle to indicate selection of said memory.

3. The execution retry controls of claim 2 additionally comprising:

memory buffer means;

means responsive to the fetching of data from said memory to cause said data to be stored in said memory buffer means; and selectively operable means responsive to the detection of an error by said error detection means to cause the contents of said memory buffer means to be stored in said memory if said regeneration indication means has been set.

4. The execution retry controls of claim 3 additionally comprising:

means to correct errors in the data stored in said memory buffer means.

[5. The execution retry controls of claim 1 further comprising:

selectively operable change indicating means for indicating that data contained in at least one of said sources of data has been modified.]

6. The execution retry controls of claim [5] *1* additionally comprising:

means jointly responsive to detection of an error by said error detection means and to said change indicating means to operate one of said selectively operable data paths to transfer information from a selected one of said saving means to a selected one of said sources of data.

7. The execution retry controls of claim [5] *1* additionally comprising:

means jointly responsive to detection of an error by said error detection means and to said change indicating means to cause a selected one of said saving means to perform the function of a selected one of said sources of data.

8. The execution retry controls of claim 1 additionally comprising:

means responsive to detection of an error by said error detection means to operate one of said selectively operable data paths to transfer information from a selected one of said saving means to a selected one of said sources of data.

9. The execution retry controls of claim 1 additionally comprising:

means responsive to detection of an error by said error detection means to cause a selected one of said saving means to perform the function of a selected one of said sources of data.

10. The execution retry controls of claim 1 further comprising:

means for preventing data that has been saved in selected ones of said saving means from being modified until said function has been completely performed by said data processing system.

11. The execution retry controls of claim 1 additionally comprising:

means responsive to detection of an error by said error detecting means to operate a selected one of said data paths to restore selected source data from a selected one of saving means to a selected one of said sources of data; and means responsive to said detection of an error to cause a selected one of said saving means to perform the function of a selected one of said sources of data.

12. The execution retry controls of claim 1 additionally comprising:

means responsive to detection of an error by said error detection means to initiate retry of said function; and selectively operable means to inhibit the operation of said last-mentioned means.

13. The execution retry controls of claim 1 additionally comprising:

retry means responsive to detection of an error by *said* error detection means to initiate a retry of the function that was being performed when said error occurred.

14. The execution retry controls of claim 13 wherein:

said retry means comprises a plurality of re-execute means each capable of initiating retry of one of said functions.

15. The execution retry controls of claim 14 additionally comprising:

means responsive to said detection of an error for selecting an appropriate one of said re-execute means.

16. The execution retry controls of claim 13 wherein:

said retry means are responsive to detection of an error by said error detection means during retry of a function to re-initiate retry of said function.

17. The execution retry controls of claim 16 further comprising:

counting means responsive to said initiation of retry of a function and to said re-initiation of retry of said function to count the number of times that retry of said function has been initiated.

18. The execution retry controls of claim 17 further comprising:

solid error indicating means responsive to a predetermined count in said counting means to indicate the existence within said data processing system of a solid error.

19. The execution retry controls of claim 13 further comprising:

retry indicating means responsive to said initiation of retry to indicate that said function is being retried.

20. The execution retry controls of claim 19 wherein:

said sequence controls are responsive to an output signal from said retry indicating means to vary the operation of said data processing system.

21. In a data processing system including a central processing unit, sequence controls and sources of data, said system being capable of performing functions to modify said data, said system also including error detection means to detect the occurrence of an error during the performance of one of said functions; the improvement comprising execution retry controls comprising:

a plurality of saving means for saving source data that could be modified during the performance by said system of a function, selected ones of said saving means being capable of retaining an indication of the original form of data appearing in said sources of data at the time that performance of said function began, said selected ones of said saving means being capable of retaining said indication until performance of said function has been completed;

selectively operable data paths connecting said saving means with said sources of data;

means to operate said data paths to cause source data to be saved in said saving means;

retry means responsive to detection of an error by said error detection means to initiate a retry of the function that was being performed when said error occurred;

said retry means comprising a plurality of re-execute means each capable of retrying one of said function;

function indicating means responsive to said sequence controls for indicating the function that was being performed by said data processing system when an error occurred; and means responsive jointly to said detection of an error and to said function indicating means for selecting an appropriate one of said re-execute means.

22. The execution retry controls of claim 21 wherein:

said retry means are responsive to detection of an error by said error detection means during retry of a function to re-initiate retry of said function.

23. The execution retry controls of claim 22 additionally comprising:

selectively operable means to inhibit the operation of said retry means.

24. The execution retry controls of claim 22 additionally comprising:

means responsive to detection of an error by said error detection means to operate one of said selectively operable data paths to transfer information from a selected one of said saving means to a selected one of said sources of data.

25. The execution retry controls of claim 22 additionally comprising:

means responsive to detection of an error by said error detecting means to operate a selected one of said data paths to restore selected source data from a selected one of said saving means to a selected one of said sources of data; and means responsive to said detection of an error to cause a selected one of said saving means to perform the function of a selected one of said sources of data.

26. The execution retry controls of claim 22 additionally comprising:

retry indication means responsive to said initiation of retry to produce a signal to indicate that a function is being retried;

said sequence controls being responsive to said signal produced by said retry indicating means to vary the operation of said data processing system.

27. The execution retry controls of claim 26 additionally comprising:

means responsive to said sequence controls to reset said retry indication means after a function has been correctly executed by said data processing system.

28. The execution retry controls of claim 22 additionally comprising:

counting means responsive to initiation of retry of a function and to re-initiation of retry of said function to count the number of times that retry of said function has been initiated; and means responsive to a predetermined count in said counting means to indicate the existence within said data processing system of a solid error.

29. The execution retry controls of claim 28 additionally comprising:

means responsive to said sequence controls to reset said counting means after a function has been correctly executed by said data processing system.

30. The execution retry controls of claim 22 wherein one of said sources of data is a memory and additionally comprising:

regeneration indication means settable in response to said sequence controls during a memory cycle to indicate selection of said memory;

memory buffer means;

means responsive to the fetching of data from said memory to cause said data to be stored in said memory buffer means; and selectively operable means responsive to the detection of an error by said error detection means to cause the contents of said memory buffer means to be stored in said memory if said regeneration indication means has been set.

31. The execution retry controls of claim 30 additionally comprising:

means to correct errors in the data in said memory buffer means.

32. The execution retry controls of claim 30 additionally comprising:

means responsive to said sequence controls to reset said regeneration indication means after a function has been correctly performed by said data processing system.

33. The execution retry controls of claim 22 additionally comprising:

selectively operable change indication means for indicating that data contained in at least one of said sources of data has been modified.

34. The execution retry controls of claim 33 additionally comprising:

means jointly responsive to detection of an error by said error detection means and to said change indication means to operate one of said selectively operable data paths to transfer information from a selected one of said saving means to a selected one of said sources of data.

35. The execution retry controls of claim 33 additionally comprising:

means jointly responsive to detection of an error by said error detection means and to said change indicating means to cause a selected one of said saving means to perform the function of a selected one of said sources of data.

36. The execution retry controls of claim 33 additionally comprising:

means responsive to said sequence controls to reset said change indicating means after a function has been correctly executed by said data processing system.

37. In a data processing system including a central processing unit, sequence controls and sources of data, said system being capable of performing functions to modify said data, said system also including error detection means to detect the occurrence of an error during the performance of one of said functions; the improvement comprising execution retry controls comprising:

a plurality of saving means for saving source data that could be modified during the performance by said system of a function, selected ones of said saving means being capable of retaining an indication of the orginal form of data appearing in said sources of data at the time that performance of said function began, said selected ones of said saving means being capable of retaining said indication until performance of said function has been completed;

selectively operable data paths connecting said saving means with said sources of data;

means to operate said data paths to cause source data to be saved in said saving means;

retry means responsive to detection of an error by said error detection means to initiate a retry of the function that was being performed when said error occurred;

said retry means also being responsive to detection of an error by error detection means during retry of a function to re-initiate retry of said function;

said retry means comprising a plurality of re-execute means each capable of retrying one of said functions;

function indicating means responsive to said sequence controls for indicating the function that was being performed by said data processing system when an error occurred;

means responsive jointly to said detection of an error and to said funtion indicating means for selecting an appropriate one of said re-execute means;

means responsive to detection of an error by said error detection means to operate one of said selectively operable data paths to transfer information from a selected one of said saving means to a selected one of said sources of data:

retry indication means responsive to said initiation of retry to produce a signal to indicate that a function is being retried;

said sequence controls being responsive to said signal produced by said retry indicating means to vary the operation of said data processing system;

counting means responsive to initiation of retry of a function and re-initiation of retry of said function to count the number of times that retry of said function has been initiated;

means responsive to a predetermined count in said counting means to indicate the existence within said data processing system of a solid error;

means responsive to said sequence controls to reset said counting means after a function has been correctly executed by said data processing system; and means responsive to said sequence controls to reset said retry indication means after a function has been correctly executed by said data processing system.

38. The execution retry controls of claim 37 additionally comprising:

selectively operable means to inhibit the operation of said retry means.

39. The execution retry controls of claim 37 additionally comprising:

means responsive to said detection of an error by said error detection means to cause a selected one of said saving means to perform the function of a selected one of said sources of data.

40. The execution retry controls of claim 37 wherein one of said sources of data is a memory and additionally comprising:

regeneration indication means settable in response to said sequence controls during a memory cycle to indicate selection of said memory;

memory buffer means;

means responsive to the fetching of data from said memory to cause said data to be stored in said memory buffer means;

selectively operable means responsive to the detection of an error by said error detection means to cause the contents of said memory buffer means to be stored in said memory if said regeneration indication means has been set; and means responsive to said sequence controls to reset said regeneration indication means after a function has been correctly performed by said data processing system.

41. The execution retry controls of claim 40 additionally comprising:

means to correct errors in the data that is in said memory buffer means before said data has been stored in said memory.

42. The execution retry controls of claim 37 additionally comprising:

selectively settable change indication means responsive to said sequence controls for indicating that data contained in at least one of said sources of data has been modified;

means jointly responsive to detection of an error by said error detection means and to said change indication means to prevent operation of said selectively operable data paths if said indicating means has not been set; and means responsive to said sequence controls to reset said change indicating means after a function has been correctly executed by said data processing system.

43. The execution retry controls of claim 42 additionally comprising:

means jointly responsive to detection of an error by said error detection means and to said change indicating means to cause a selected one of said saving means to perform the function of a selected one of said sources of data.

*44. In a data processing system including a central processing unit, sequence controls and sources of data, one of said sources of data being a memory, said system being capable of performing functions to modify said data, said system also including error detection means to detect the occurrence of an error during the performance of one of said functions; the improvement comprising execution retry controls comprising:*

*a plurality of saving means for saving source data that could be modified during the performance by said system of a function, said saving means being capable of retaining an indication of the original form of data appearing in said sources of data at the time that performance of said function began, said saving means being capable of retaining said indication until performance of said function has been completed;*

*selectively operable data paths connecting said saving means with said sources of data;*

*means to operate said data paths at predetermined times to cause source data to be saved in said saving means in anticipation of the possible occurrence of an error;*

*regeneration indication means settable in response to said sequence controls during a memory cycle to indicate selection of said memory;*

*memory buffer means;*

*means responsive to the fetching of data from said memory to cause said data to be stored in said memory buffer means; and*

*selectively operable means responsive to the detection of an error by said error detection means to cause*

*the contents of said memory buffer means to be stored in said memory if said regeneration indication means has been set.*

*45. In a data processing system including a central processing unit, sequence controls and sources of data, said system being capable of performing functions to modify said data, said system also including error detection means to detect the occurrence of an error during the performance of one of said functions; the improvement comprising execution retry controls comprising:*

*a plurality of saving means for saving source data that could be modified during the performance by said system of a function, said saving means being capable of retaining an indication of the original form of data appearing in said sources of data at the time that performance of said function began, said saving means being capable of retaining said indication until performance of said function has been completed;*

*selectively operable data paths connecting said saving means with said sources of data;*

*means to operate said data paths at predetermined times to cause source data to be saved in said saving means in anticipation of the possible occurrence of an error;*

*retry means responsive to detection of an error by error detection means to initiate a retry of the function that was being performed when said error occurred; and*

*means responsive to said detection of an error by said error detection means to cause a selected one of said saving means to perform the function of a selected one of said sources of data.*

*46. The execution retry controls of claim 45 additionally comprising:*

*means responsive to said detection of an error by said error detecting means to operate another selected one of said data paths to restore selected source data from another selected one of saving means to another selected one of said sources of data.*

References Cited

The following reference, cited by the Examiner, are of record in the patented file of this patent or the original patent.

UNITED STATES PATENTS

| | | | |
|---|---|---|---|
| 3,539,996 | 11/1970 | Bee et al. | 340—172.5 |
| 3,533,082 | 10/1970 | Schnabel et al. | 340—172.5 |
| 3,440,619 | 4/1969 | Lehman et al. | 340—172.5 |
| 3,409,879 | 11/1968 | Keister | 340—172.5 |
| 3,339,183 | 8/1967 | Bock | 340—172.5 |
| 3,248,697 | 4/1966 | Montgomery | 340—146.1 |
| 3,085,230 | 4/1963 | Shoultes | 235—153 X |
| 3,037,698 | 6/1962 | Saxenmeyer | 235—153 |
| 3,343,141 | 9/1967 | Hackl | 340—172.5 |
| 3,405,258 | 10/1968 | Godoy et al. | 340—172.5 X |

PAUL J. HENON, Primary Examiner

R. F. CHAPURAN, Assistant Examiner